Nov. 21, 1950     F. HOBBS     2,531,128
METHOD OF LAMINATING WALLS
Filed Oct. 27, 1947     2 Sheets-Sheet 1
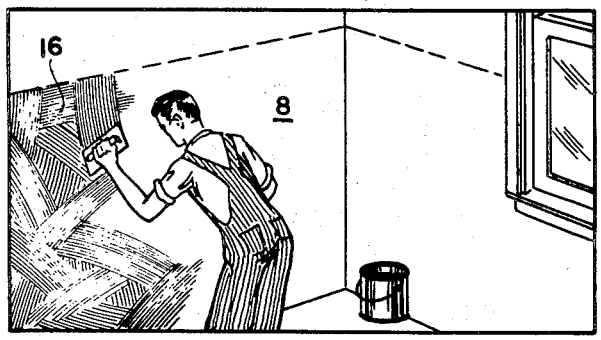
FIG—1
FIG—2
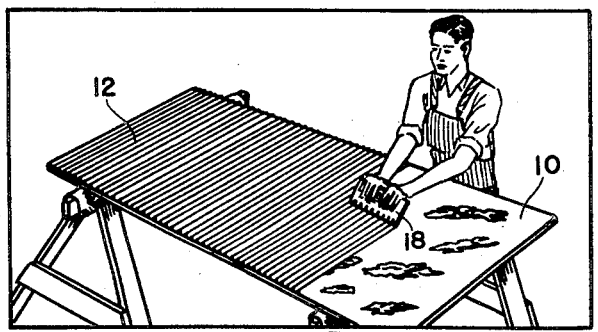
FIG—3
FRANK HOBBS
Inventor
By Smith + Tuck
Attorneys Nov. 21, 1950     F. HOBBS     2,531,128
METHOD OF LAMINATING WALLS
Filed Oct. 27, 1947     2 Sheets-Sheet 2
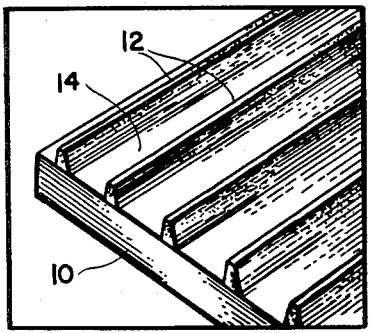
FIG_4
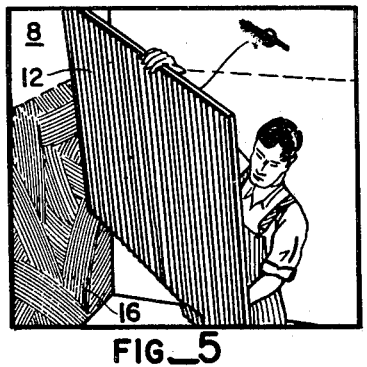
FIG_5
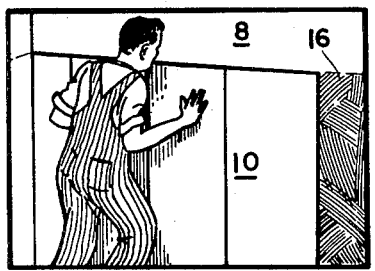
FIG_6
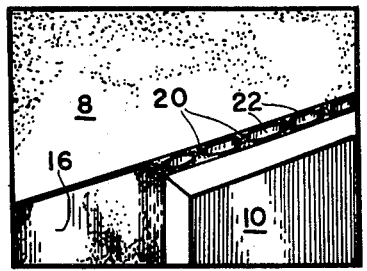
FIG_7
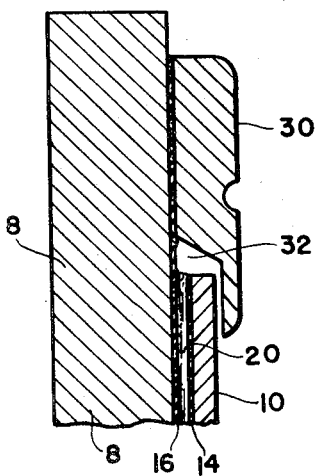
FIG_8
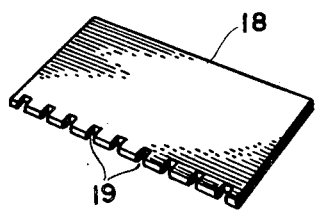
FIG_9
FRANK HOBBS
Inventor
By Smith & Tuck
Attorneys Patented Nov. 21, 1950

2,531,128

UNITED STATES PATENT OFFICE 2,531,128

METHOD OF LAMINATING WALLS

Frank Hobbs, Seattle, Wash., assignor to Research Holdings, Inc., Seattle, Wash.

Application October 27, 1947, Serial No. 782,296

9 Claims. (Cl. 20—4)

This invention relates to a method of laminating walls and, more particularly, is a process of preparing walls and wallboard for the application of sheet-like, semi-rigid boards, with adhesive, to such walls.

In recent years the use of hardboard, softboard, and plywood for lamination on pre-existing or new walls has become increasingly popular, because such boards are clear grained and usually of substantial size and can be painted, or otherwise prefinished, in a factory under controlled conditions.

The larger size means that fewer joints will be involved in the finished wall than with narrower boards. The prefinished surface means that a wall may now have a durable, glossy, and attractive surface, superior to any obtainable even by the most skilled craftsman working by hand. It has heretofore been customary to nail such boards in place in some installations, while others have been applied by the use of adhesive materials, in the manner of linoleum laying. Neither method has been fully satisfactory, because the nailed board is disfigured by the nails used, and it also may be warped into the uneven lines of the wall, despite furring. Previously, the application of wallboard with adhesive resulted in a duplication of the waves of uneven wall surfaces in the exposed face of the wallboard. These are only a few of the many difficulties encountered and the attempted solutions. The obvious end desired in using such glossy-surfaced wallboards as are now available is to produce a perfectly flat, vertical disposition of the wallboard, since the surfaces, if warped, so distort any reflected images that, even when viewed from a relatively wide angle, any unevenness becomes most apparent.

It is, therefore, a prime object of this invention to provide a method of laminating glossy, smooth-surfaced wallboards to walls so that the surface of the wallboard will be disposed in a substantially flat, vertical plane, irrespective of the waves and unevenness of the wall, without requiring elaborate shimming or furring, or a high degree of skill in the workman.

Another object has been the provision, in a method as described, of novel steps of preparing the wall and wallboard by the application of adhesive materials in such a manner that wavy surfaces may be covered by a semi-rigid wallboard without the surface of the wallboard acquiring the contour of the wall.

One other object of the invention resides in the provision, in a method as described, of steps of preparing and applying wallboard so that the wallboard will be elastically and adhesively held during early stages of the installation, but which will become substantially rigid with the passage of only a short interval of time.

A still further object of the invention has been the provision, in a method as described, of a novel step of applying adhesive to wallboards so that, well within the skill of an ordinary workman, effective cohesion may be obtained, even though substantial intervals of time may elapse between the adhesive treatment of the wallboard and its application to the wall.

Still another object of the invention is to provide a method of supporting wallboard in a flat plane, and rigidly, over wavy walls without requiring furring or major resurfacing of the wall.

The foregoing objects and others ancillary thereto, I prefer to accomplish as follows:

In the preferred embodiment of my method, I employ a quick-setting elastic adhesive material, that is applied to both the wall and the wallboard and which, when two such treated surfaces are brought together, has great affinity and develops substantial bonds between the wall and wallboard, but which may air-dry rapidly and soon become non-tacky to foreign objects not so treated. The adhesive is preferably skin-coated to the wall and ridge-coated to the wallboard, and then the latter is laminated to the former with pressure so that the ridges are ruptured to permit exudation of adhesive that has been entrapped therein. When such adhesive is released, it fuses with the skin-coat of the wall and forms the desired bond. It is also part of this method to insure that the adhesive coating will be vented to permit breathing and setting-up to a slight degree of elasticity, but nevertheless provide support. Such method being followed, it is possible to dispose glossy-surfaced wallboards in flat, upright planes, despite the fact that the wall so laminated is wavy and uneven, and yet without such wall being furred or otherwise resurfaced to any major degree.

The novel features that I consider characteristic of my method are set forth with particularity in the appended claims. The method itself, however, will best be understood from the following description of a specific embodiment when read in connection with the accompanying drawings, in which:

Fig. 1 is a perspective view showing the step of skin-coating a wall with adhesive;

Fig. 2 is a perspective view showing the application of adhesive to the wallboard;

Fig. 3 is a perspective view showing the "combing" of the adhesive into even ridges;

Fig. 4 is an enlarged perspective view of a portion of a ridge-coated wallboard;

Fig. 5 is a view showing the wallboard ready to be placed in position on the wall;

Fig. 6 is a perspective view showing the board being pressed into place on the wall;

Fig. 7 is an enlarged detail view in perspective showing the manner of venting the adhesive between the wall and wallboard;

Fig. 8 is an enlarged cross-sectional view of a portion of the upper edge of the wallboard; and Fig. 9 is a perspective view of the comb used to coat the wallboard.

A practical method for the purposes stated, and to overcome the problems heretofore prevalent, must have at least two totally distinct characteristics; it must be capable of being simply passed on to workmen without requiring elaborate instructions; and it must be capable of being practiced by relatively unskilled workmen and still permit the production of attractive and fully satisfactory applications of wallboard to walls of a great variety of textures and uneven surfaces.

It is necessary to understand that in the case of the application of wallboard to plastered walls, many difficulties can be encountered. A plastered wall is usually applied by hand, by a workman using a trowel and mortar. The workman sweeps the trowel and mortar across the wall in strokes of about two feet, more or less. Since the stroke tends to be arcuate, and because the workman is unable to apply absolutely even pressure during such a stroke, the result is a surface that comprises a multitude of valleys and ridges that often vary from a true plane as much as $\frac{1}{8}$ inch. Such is not readily apparent with sand-treated walls, but becomes increasingly apparent with smoother walls.

Recently, it has become increasingly popular to apply prefinished wallboard, formed of Masonite or plywood, to kitchen and bathroom walls, because of the ease with which they may be cleaned and so maintained. It is possible, in the controlled conditions obtainable in factories, to finish such sheets by painting, or otherwise, so that they will have glossy surfaces that reflect a great amount of light. If such wallboard, which has a natural stability that will maintain it in a substantially flat plane, is firmly and fully secured to a wavy wall, the distortion of reflected images will be most apparent to the casual observer, even when viewing the wall from a rather wide angle. By my method I am able to apply such board, so that the waves of the wall are spanned and the board will lie in an upright, substantially flat, plane. This is accomplished by permitting the board to overcome deflections incident to its application to the wall, and to resume its normal stable condition. How this is done is more fully set forth in the following detailed description of the method.

The usual initial step of the method is the skin-coating of the adhesive to the wall surface to be laminated. Gobs of adhesive are first applied to the wall and are then trowelled, as shown in Figure 1, with a straight-edged tool and with pressure to force the adhesive into any interstices of the wall, and to tend to fill up cavities and low spots. The adhesive is preferably one having a rubbery nature that will provide some elasticity, and one that includes a vehicle that will readily volatilize and leave the adhesive non-tacky to objects that are foreign and not coated with a similar adhesive. The workman may apply the skin-coat of adhesive and leave the wall to dry, while turning his attention to preparing the wallboard, without being under any great need of urgency.

The wallboard 10, which has been previously cut to fit the wall that is being laminated, is best supported face down on padded horses. To the face that will lie against the wall, a second quantity of adhesive is applied in a suitable amount and then combed (see Figs. 2 and 3) to form spaced apart ridges 12. I have found that by forming a comb 18 of sheet material, such as Masonite, with notches 19 about $\frac{1}{8}"$ x $\frac{1}{4}"$ in size, and spaced apart center to center approximately $\frac{3}{8}"$, I am able to comb into the adhesive a series of ridges that will rise approximately $\frac{1}{16}"$ from a base of $\frac{1}{8}"$. As shown in Fig. 4, between the ridges 12 the wallboard will have skin-coats 14 like the wall coat 16 shown in Fig. 5. The workman should insure that the ridges run in a direction that will be upright when the wallboard is in place, for reasons that I shall more fully set forth later.

The ridged adhesive will surface dry, and thereby entrap, in the core of the ridges, a quantity of adhesive which, being unexposed to the atmosphere, will remain fluid and tacky for a long time. Because of the pressure applied during combing, the ridges will have been pressed tightly to the wallboard and thereby caused to adhere to the same.

When the wall 8 and wallboard 10 have been prepared as described, the wallboard is next brought into juxtaposition, as shown in Fig. 5, with the ridged coat 12 approaching skin-coat 16. As the board is pressed to the wall, as the workman can be seen doing in Fig. 6, the ridges 12 are caused to rupture, because of the pressure concentrated on them, and thus is permitted the release of the entrapped fluid adhesive therein. This adhesive will flow out of the rupture and contact the skin-coat of the wall, to which it will fuse through the natural affinity of the material. Assuming that an area on the wall, against which the flat board is pressed, is slightly crowned, the adhesive that has been released will flow out to a degree, and the adhesive of adjacent ridges will tend to intermingle therewith. However, the adhesive that contacts a low spot on the wall will fuse, but the form of the ridge will tend to remain, and air passages will exist between the adjacent ridges. If the workman presses the board firmly into the recess or depression of the wall, naturally he will deflect the board from its normal plane. But, when the pressure is released, the inherent tendency of the board to return to its planar condition will assert itself, and the board will withdraw from the bottom of the depression and lie from crown to crown, on either side of the depression. This exerts a pull on the adhesive and causes webs 20 to form between the wall and the wallboard, as shown in Fig. 7. Between the webs are the air passages 22 that permit venting of the volatiles of the adhesive, in what is known as a breathing action, due to expansion and contraction at later times.

If the workman needs to move the partially applied wallboard laterally or vertically, such movement is facilitated by the ridges, because they tend to reduce suction, such as would be had if both surfaces were skin-coated, and also because the ridges are relatively easily distorted due to the greater degree of line contact present.

When the board is properly positioned, it is customary to set a few small brads along the upper edge. Occasionally, shoring is necessary, but it is most desirable to insure that the major portion of the board be permitted to resume its normal plane and not be under external pressure, as that would possibly result in its being forced to the bottom of any wall depression.

With the ridges running upwardly, the spaces therebetween will terminate at the top edge in communication with the atmosphere. This top edge is ordinarily trimmed with a cap molding 30, shown in Fig. 7 to have a rabbeted groove 32 of a size and shape to easily receive the board edge. Such molding is also adhesively joined to the wall and it is most desirable that the spaces between the adhesive ridges 12 should not be closed off. This is accomplished by mounting the cap in slightly vertical spaced relationship, so that air may move through the rabbeted groove 32 in the manner suggested in Fig. 7.

While I have shown and described particular embodiments of my invention, it will occur to those skilled in the art that various changes and modifications may be made without departing from the invention, and I therefore aim in the appended claims to cover all such changes and modifications as fall within the true spirit and scope of my invention.

Having thus described my invention, I claim:

1. The method of laminating walls with semi-rigid wallboards and the like, comprising: skin-coating with adhesive the wall surface to be laminated; applying a coat of adhesive that sets up to an elastic condition on the wallboard face to lie against said wall, and forming spaced apart ridges in said coat on the wallboard of a size and shape to entrap substantial quantities of adhesive unexposed to the atmosphere; and pressing the wallboard to the wall and rupturing the ridges of said wallboard coating, without totally dissipating laterally from said ridges the adhesive material thereof.

2. The method of laminating walls with semi-rigid wallboards and the like, comprising: skin-coating with adhesive the wall surface to be laminated; applying a coat of adhesive that sets up to an elastic condition on the wallboard face to lie against said wall, and forming spaced apart ridges in said coat on the wallboard of a size and shape to entrap substantial quantities of adhesive unexposed to the atmosphere; pressing the wallboard to the wall and rupturing the ridges of said wallboard coating without totally dissipating laterally from said ridges the adhesive material thereof; and finally permitting the wallboard to resume its natural planar disposition free from distortion.

3. The method of laminating walls with semi-rigid wallboards and the like, comprising: skin-coating with adhesive the wall surface to be laminated; applying a coat of adhesive on the wallboard face to lie against said wall, and forming spaced apart ridges in said coat from edge-to-edge of the wallboard of a size and shape to entrap substantial quantities of adhesive unexposed to the atmosphere; said ridges being arranged to be vertical when the wallboard is positioned on the wall; and pressing the wallboard to the wall and rupturing without totally dissipating laterally the ridges of said wallboard coating whereby the wallboard is secured to the wall by a series of upright spaced-apart webs of adhesive.

4. The method of laminating walls with semi-rigid wallboards and the like, comprising: skin-coating with adhesive the wall surface to be laminated; applying a coat of adhesive on the wallboard face to lie against said wall, and forming spaced apart ridges in said coat from edge-to-edge of the wallboard of a size and shape to entrap substantial quantities of adhesive unexposed to the atmosphere; said ridges being arranged to be upright when the wallboard is positioned on the wall; pressing the wallboard to the wall and rupturing without totally dissipating laterally the ridges of said wallboard coating whereby the wallboard is secured to the wall by a series of upright spaced-apart webs of adhesive; and finally permitting the wallboard to resume its natural planar disposition free from distortion.

5. The method of laminating walls with semi-rigid wallboards and the like, comprising: skin-coating with adhesive the wall surface to be laminated; applying a coat of adhesive that sets up to an elastic condition on the wallboard face to lie against said wall, and forming spaced apart ridges in said coat from edge-to-edge of the wallboard of a size and shape to entrap substantial quantities of adhesive unexposed to the atmosphere, said ridges to be vertical when the wallboard is positioned against the wall; and pressing the wallboard to the wall and rupturing without totally dissipating the ridges of said wallboard coating in a manner insuring the free vertical passage of air between said ridges to permit the drying of the adhesive.

6. The method of laminating walls with semi-rigid wallboards and the like, comprising: skin-coating the wall with an adhesive material and permitting the same to dry to a consistency non-tacky to foreign objects; combing a layer of the same adhesive material on the back face of the wallboard lamina and forming spaced apart ridges of the adhesive from edge-to-edge of the wallboard that sets up to an elastic condition to entrap some of the adhesive in unexposed condition, said ridges to be vertical when the wallboard is position against the wall; applying the wallboard lamina to the wall with pressure and rupturing without totally dissipating laterally said ridges to release the entrapped adhesive to fuse with the adhesive skin-coated to the wall; and finally edge-venting said wallboard at the ends of said ribs to facilitate drying said adhesive while permitting the walboard lamina to resume its natural planar stable condition and be free from distortion.

7. The method of laminating walls with semi-rigid wallboard and the like, comprising: skin-coating the wall with a quick-setting, elastic, adhesive material and permitting the same to dry to a non-tacky surface consistency; combing a layer of the same quick-setting, elastic, adhesive material on the back of the wallboard lamina to form spaced apart unidirectional ridges of the adhesive material extending from edge-to-edge of the wallboard, between which ridges are skin-coats as on the wall, and allowing said ridges and skin-coats to dry to a non-tacky surface consistency; applying the wallboard lamina to the wall with pressure and rupturing said ridges to release the entrapped adhesive to fuse with the adhesive on the wall but without totally dissipating laterally the adhesive of said ridges; and finally venting said adhesive surfaces at the ridge ends for the drying of said adhesive while permitting the wallboard lamina to resume its natural planar stability and be free from distortion.

8. In combination with a building wall, a laminating structure, comprising: a sheet of semirigid wallboard juxtaposed to said wall and adhesively secured thereto, said adhesive securing means being characterized by including a skincoat covering the wall and the wallboard and being joined by a series of spaced apart webs formed of the adhesive material.

9. In combination with a building wall, a laminating structure, comprising: a sheet of semirigid wallboard juxtaposed to said wall and adhesively secured thereto, said adhesive securing means being characterized by including a skincoat covering the wall and the wallboard and being joined by a series of spaced apart upright webs formed of the adhesive material.

FRANK HOBBS.

REFERENCES CITED

The following references are of record in the file of this patent:

UNITED STATES PATENTS

| Number | Name | Date |
|---|---|---|
| 1,852,696 | Chaffee | Apr. 5, 1932 |
| 2,054,448 | Russell | Sept. 15, 1936 |
| 2,178,566 | Dike | Nov. 7, 1939 |
| 2,205,600 | Payzant | June 25, 1940 |
| 2,290,548 | Galber | July 21, 1942 |